US007353540B2

(12) United States Patent
Kishi et al.

(10) Patent No.: US 7,353,540 B2
(45) Date of Patent: Apr. 1, 2008

(54) INFORMATION VENDING APPARATUS, INFORMATION VENDING METHOD, AND PROGRAM STORAGE MEDIUM

(75) Inventors: Haruhiko Kishi, Kanagawa (JP); Akira Kurihara, Kanagawa (JP)

(73) Assignee: Sony Corporation, Tokyo (JP)

( * ) Notice: Subject to any disclaimer, the term of this patent is extended or adjusted under 35 U.S.C. 154(b) by 869 days.

(21) Appl. No.: 09/820,852

(22) Filed: Mar. 30, 2001

(65) Prior Publication Data

US 2001/0053224 A1  Dec. 20, 2001

(30) Foreign Application Priority Data

Mar. 31, 2000  (JP)  .............................. 2000-096883

(51) Int. Cl.
*H04L 9/06* (2006.01)

(52) U.S. Cl. .................. 726/26; 380/201; 380/232; 380/239

(58) Field of Classification Search .................. 705/1, 705/5, 26, 27; 380/24, 25, 23, 232, 201, 380/230, 239; 386/94; 726/26, 2
See application file for complete search history.

(56) References Cited

U.S. PATENT DOCUMENTS

| 6,226,618 | B1 * | 5/2001 | Downs et al. .................. 705/1 |
| 6,385,596 | B1 * | 5/2002 | Wiser et al. ................... 705/51 |
| 6,477,649 | B2 * | 11/2002 | Kambayashi et al. ......... 726/27 |
| 6,778,757 | B1 * | 8/2004 | Kawamae et al. ............. 386/94 |
| 6,889,208 | B1 * | 5/2005 | Okabe et al. .................. 705/57 |

FOREIGN PATENT DOCUMENTS

| EP | 0 561 685 A2 | 9/1993 |
| EP | 0 874 300 A2 | 10/1998 |
| EP | 0 878 796 A2 | 11/1998 |
| EP | 0 951 019 A2 | 10/1999 |
| WO | WO 00/08909 | 2/2000 |

OTHER PUBLICATIONS

U.S. Appl. No. 09/802,133, filed Mar. 9, 2001, pending.
U.S. Appl. No. 09/801,802, filed Mar. 9, 2001, pending.
U.S. Appl. No. 09/803,898, filed Mar. 13, 2001, pending.
U.S. Appl. No. 09/820,852, filed Mar. 30, 2001, pending.
U.S. Appl. No. 09/854,475, filed May 15, 2001, pending.
"SDMI Portable Device Specification Part 1 Version 1.0", SDMI Secure Digital Music Initiative, XP-002217889, Jul. 8, 1999, pp. 1-35.
"Guide to the SDMI Portable Device Specification Part 1, Version 1.0", SDMI Secure Digital Music Initiative, XP-002410128, Jul. 8, 1999, pp. 1-5.

* cited by examiner

*Primary Examiner*—Ellen Tran
(74) *Attorney, Agent, or Firm*—Oblon, Spivak, McClelland, Maier & Neustadt, P.C.

(57) ABSTRACT

The present invention is intended to prevent sold digital information from being used in a non-compliant manner. Digital information accumulation capability 212 accumulates digital information 6 to be sold. License generating capability 227 generates the usage conditions for digital information 6. Encryption capability 229 encrypts digital information 6. Digital information key generating capability 228 generates a cryptographic key for decrypting encrypted digital information 6. Authentication capability 214 authenticates recording medium with license management capability 102-1 loaded in digital information vending apparatus 101. Licensed digital information writing capability 230 writes encrypted digital information and its usage conditions and cryptographic key onto authenticated recording medium with license management capability 102-1.

20 Claims, 8 Drawing Sheets

FIG. 5

| DIGITAL INFORMATION |
|---|
| USAGE CONDITIONS |
| DIGITAL INFORMATION KEY |

INFORMATION VENDING APPARATUS, INFORMATION VENDING METHOD, AND PROGRAM STORAGE MEDIUM

BACKGROUND OF THE INVENTION

The present invention relates generally to an information vending apparatus and an information vending method and a program storage medium and, more particularly, to an information vending apparatus, an information vending method, and a program storage medium for selling information such as music data for example.

Figure 1:
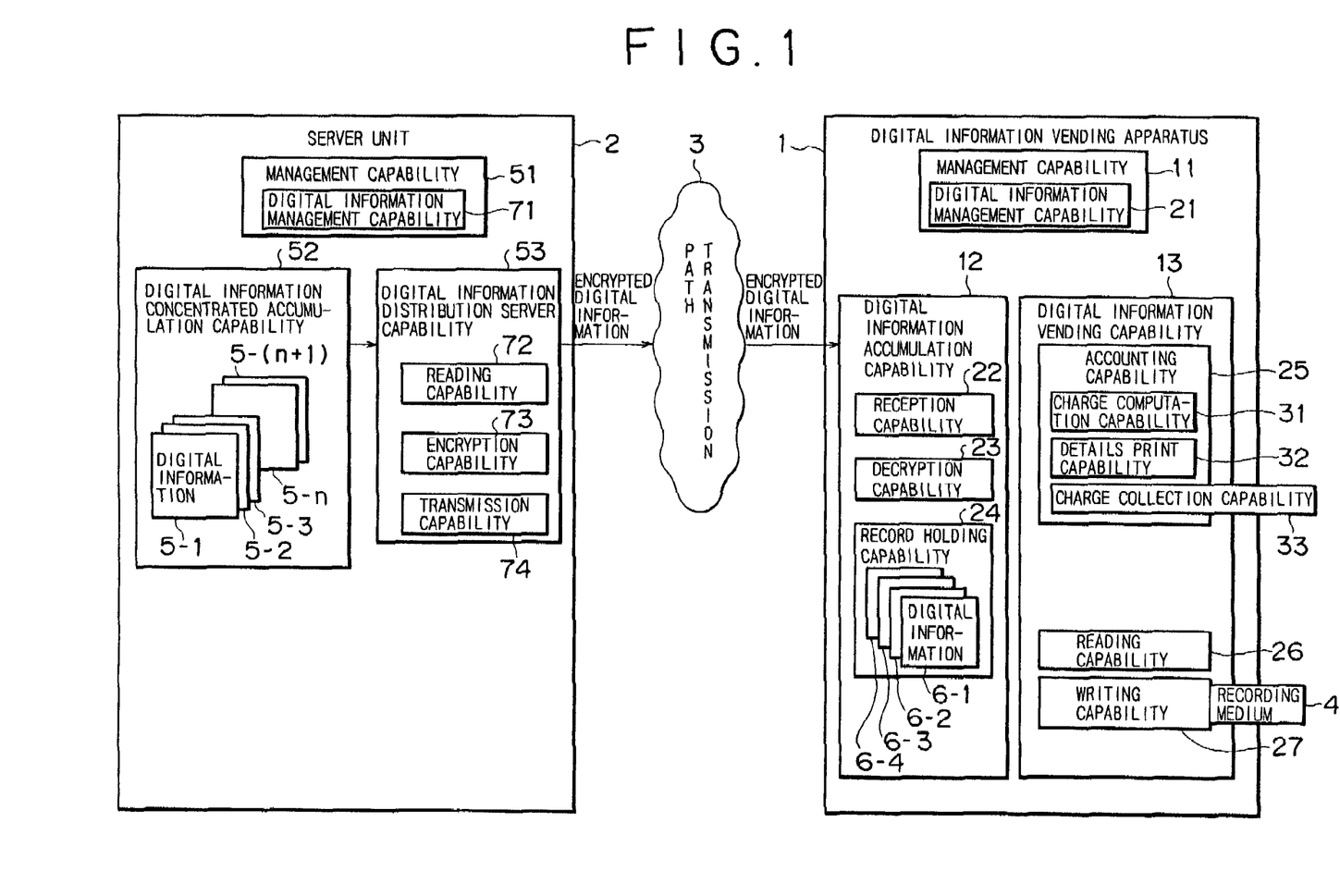
FIG. 1 is a schematic diagram illustrating the configuration of a prior-art digital information vending system.

Now, referring to FIG. 1, there is shown a schematic diagram illustrating the configuration of a prior-art digital information vending system. In the Figure, a digital information vending apparatus 1, installed at the storefront (of such as a convenience store), receives digital information from a server unit 2 via a transmission path 3 and stored the received digital information in itself. When selling the digital information stored inside, the digital information vending apparatus 1 records the digital information onto a recording medium 4 which is loaded in the digital information vending apparatus 1 by a purchaser.

The digital information vending apparatus 1 comprises a management capability 11, a digital information accumulation capability 12, and a digital information vending capability 13. The management capability 11 has a digital information management capability 21 that controls the digital information accumulation capability 12 and the digital information vending capability 13.

The digital information accumulation capability 12 comprises a reception capability 22, a decryption capability 23, and a record holding capability 24. The reception capability 22 receives the encrypted digital information from the server unit 2 via the transmission path 3 and supplies the received digital information to the encryption capability 23.

The decryption capability 23 stores a cryptographic key in advance and decrypts the encrypted digital information supplied from the reception capability 22. The record holding capability 24 record the decrypted digital information supplied from the decryption capability 23 as arranged in digital information 6-1 through digital information 6-4.

The digital information vending capability 13 comprises an accounting capability 25, a reading capability 26, and a writing capability 27.

The accounting capability 25 collects money from the purchaser of any of the digital information 6-1 through 6-4 stored in the digital information accumulation capability 12. The accounting capability 25 further comprises a charge computation capability 31, a details print capability 32, and a charge collection capability 33.

The charge computation capability 31 computes the price of the digital information 6-1 through 6-4 sold. The details print capability 32 prints, on a receipt, such information about sold digital information 6-1 to 6-4 as its sale price for example.

The charge collection capability 33 collects the charge for the sold digital information 6-1 to 6-4 from the money thrown in by the purchaser.

The reading capability 26 reads the sold digital information 6-1 to 6-4 from the digital information accumulation capability 12 when the payment has been made by the purchaser and supplies the retrieved digital information 6-1 to 6-4 to the writing capability 27.

The writing capability 27 writes the sold digital information 6-1 to 6-4 supplied from the reading capability 26 onto the loaded recording medium 4.

In what follows, the digital information 6-1 through 6-4 are generically referred to as digital information 6 for simplify unless otherwise specified.

The server unit 2 selects, at a predetermined time (for example, twelve midnight every day) recorded digital information 5-1 to 5-(n+1) to be transmitted to the digital information vending apparatus 1 and sends the selected digital information 5-1 to 5-(n+1) to the digital information vending apparatus 1 via the transmission path 3.

The server unit 2 has a management capability 51, a digital information concentrated accumulation capability 52, and a digital information distribution server capability 53. The management capability 51 has a digital information management capability 71 to control the digital information concentrated accumulation capability 52 and the digital information distribution server capability 53.

The digital information concentrated accumulation capability 52 accumulates the digital information 5-1 through 5-(n+1) which are transmitted to the digital information vending apparatus 1.

The digital information distribution server capability 53 reads digital information 5-1 to 5-(n+1) from the digital information concentrated accumulation capability 52, encrypts the retrieved digital information, and sends it to the digital information vending apparatus 1 via the transmission path 3. The digital information distribution server capability 53 has a reading capability 72, an encryption capability 73, and a transmission capability 74.

The reading capability 72 reads the digital information 5-1 to 5-(n+1) from the digital information concentrated accumulation capability 52 and supplies the retrieved digital information to the encryption capability 73. The encryption capability 73 encrypts digital information 5-1 to 5-(n+1) supplied from the reading capability 72 by an encryption algorithm such as DES (Data Encryption Standard) and supplies the encrypted digital information to the transmission capability 74. The transmission capability 74 sends the encrypted digital information 5-1 to 5-(n+1) to the digital information vending apparatus 1 via the transmission path 3.

In what follows, the digital information 5-1 through 5-(n+1) is generically referred to as digital information 5 unless otherwise specified.

A problem in the above-mentioned prior-art technology is that the recording medium 4 has no capability of preventing such non-compliant uses of the digital information 6 as its unauthorized duplication and reproduction and the usage conditions of the digital information 6 are not recorded on the recording medium 4, making it impossible to prevent the non-compliant use from taking place.

SUMMARY OF THE INVENTION

It is therefore an object of the present invention to prevent non-compliant use of sold digital information.

To achieve the above object, according to a first aspect of the present invention, there is provided an information vending apparatus including: accumulation means for accumulating information for sale; usage condition generating means for generating usage conditions for the information for sale; encryption means for encrypting the information for sale; encryption key generating means for generating a cryptographic key which decrypts the information for sale which is encrypted; authentication means for authenticating a recording medium directly or indirectly loaded on the information vending apparatus in one of direct and indirect manners; and writing means for writing the encrypted information for sale to the recording medium authenticated by the authentication means along with the usage conditions and the cryptographic key.

According to a second aspect of the present invention, there is provided an information vending method including the steps of: accumulating information for sale; generating usage conditions for the information for sale; encrypting the information for sale; generating a cryptographic key which decrypts the information for sale which is encrypted; authenticating a recording medium loaded on the information vending apparatus in one of direct and indirect manners; and writing the encrypted information for sale to the recording medium authenticated in the authentication step along with the usage conditions and the cryptographic key.

According to a third aspect of the prevent invention, there is provided a program storage medium storing a computer-readable program including the steps of: accumulating information for sale; generating usage conditions for the information for sale; encrypting the information for sale; generating a cryptographic key which decrypts the information for sale which is encrypted; authenticating a recording medium loaded on the information vending apparatus in one of direct and indirect manners; and writing the encrypted information for sale to the recording medium authenticated in the authentication step along with the usage conditions and the cryptographic key.

According to the first, second, and third aspects of the present invention, the information for sale is accumulated, the usage conditions thereof are generated, the information for sale is encrypted, a cryptographic key for decrypting the encrypted information for sale is generated, a recording medium loaded in the information vending apparatus is authenticated, and the encrypted information is written to the authenticated recording medium along with the usage conditions and the cryptographic key, whereby, non-compliant use of sold digital information can be prevented.

BRIEF DESCRIPTION OF THE DRAWINGS

These and other objects of the invention will be seen by reference to the description, taken in connection with the accompanying drawings, in which.

DETAILED DESCRIPTION OF PREFERRED EMBODIMENTS

This invention will be described in further detail by way of example with reference to the accompanying drawings.

Figure 2:
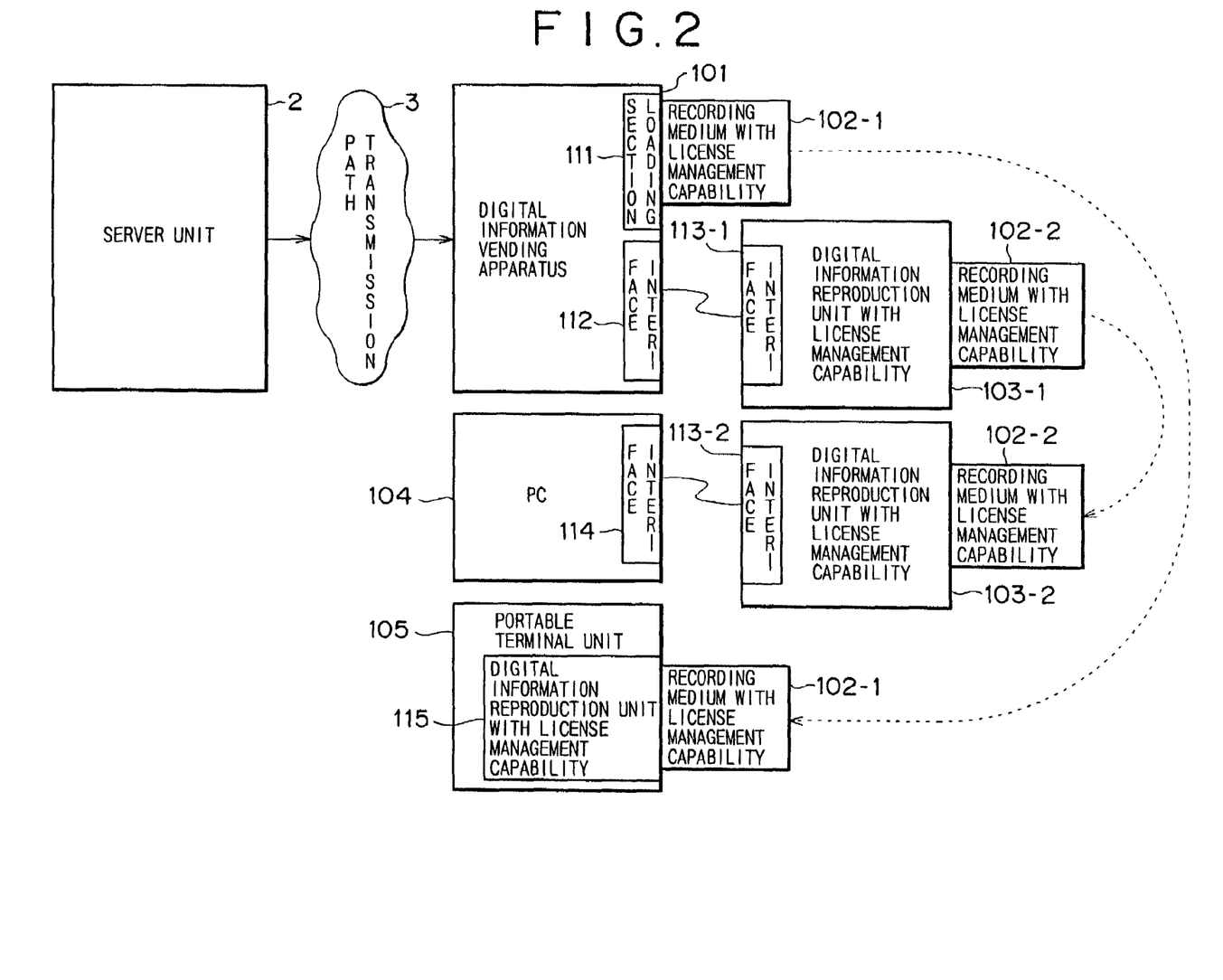
FIG. 2 is a schematic diagram illustrating a digital information vending apparatus practiced as one embodiment of the invention.

Now, referring to FIG. 2, there is shown a schematic diagram illustrating a digital information vending system practiced as one embodiment of the present invention. A digital information vending apparatus 101, installed at a storefront of such as a convenience store or installed as a kiosk vending machine at railway stations for example, receives digital information (including program, text, music including tone, voice, still picture, and moving picture data) from a server unit 2 via a transmission path 3 and stored the received digital information in itself.

When selling digital information which is music data for example, the digital information vending apparatus 101 generates the usage conditions for the digital information on the basis of the SDMI (Secure Digital Music Initiative) standard and, at the same time, generates a cryptographic key (hereafter referred to as a digital information key) to encrypt the digital information such that it can be decrypted by the generated digital information key, supplying the encrypted digital information, its usage conditions and the digital information key to a recording medium with license management capability 102-1 or a digital information reproduction unit with license management capability 103-1.

When encrypting the digital information with a common-key encryption algorithm such as DES, the digital information vending apparatus 101 encrypts the digital information with the digital information key. When encrypting the digital information with a public-key encryption algorithm such as RSA (Rivest-Shamir-Adelman), the digital vending apparatus 101 encrypts the digital information with a private key and sends the encrypted digital information to the recording medium with license management capability 102-1 or the digital information reproduction unit with license management capability 103-1 with a public key used as the digital information key.

For example, in use of the digital information which is music data, the digital information reproduction units with license management capability 103-1 and 103-2, a personal computer (PC) 104, and a portable terminal unit 105 have each an LCM (Licensed Compliant Module), a software module based on SDMI, and enable or disable such operations to be executed on the digital information as check-in, checkout, copying, and moving, on the basis of its usage conditions.

The recording media with license management capability 102-1 and 102-2 manage the use of the recorded digital information (for example, enable or disable of its reading) on the basis of its usage conditions.

The transmission path 3, wired or wireless, is leased line, LAN (Local Area Network), ISDN (Integrated Services Digital Network), XDSL (x Digital Subscriber Line), telephone line, PHS (Personal Handyphone System) line, mobile telephone line, WLL (Wireless Local Loop), communications satellite line, or broadcast satellite line.

When the recording medium with license management capability 102-1 owned by a purchaser is directly or indirectly loaded in a loading section 111 of the digital information vending apparatus 101 to buy the digital information stored therein, the digital information vending apparatus 101 cross-authenticates recording medium with the license management capability 102-1. The digital information vending apparatus 101 generates the usage conditions of the digital information 6, encrypts digital information 6 and generates a digital information key for use in decrypting the encrypted digital information 6.

The digital information vending apparatus 101 records the encrypted digital information 6 onto the authenticated recording medium with license management capability 102-1 along with the usage conditions and the digital information key.

The recording medium with license management capability 102-1 with the digital information 6 recorded by the digital information vending apparatus 101 is loaded into, for example, a PDA (Personal Digital Assistant) or a portable terminal unit 105 of a mobile telephone, each having a digital information reproduction capability with license management capability 115 for example. The digital information reproduction capability with license management capability 115 of the portable terminal unit 105 reads digital information 6 from the recording medium with license management capability 102-1 and can use the digital information 6 on the basis of its usage conditions.

The interface 113-1 of the digital information reproduction unit with license management capability 103-1 with the recording medium with license management capability 102-2 owned by the purchaser connects to the interface 112 of the digital information vending apparatus 101 over a cable or the like for example compliant with the communication scheme of the interface 113-1 and the interface 112. When the digital information reproduction unit with license management capability 103-1 is connected, the digital information vending apparatus 101 cross-authenticates the digital information reproduction unit with license management capability 103-1.

It should be noted that, when the recording medium with license management capability 102-2 is loaded, the digital information reproduction unit with license management capability 103-1 cross-authenticates the recording medium with license management capability 102-2.

The digital information vending apparatus 101 records the digital information 6 and its usage conditions and the digital information key onto the recording medium with license management capability 102-2 loaded in the digital information reproduction unit with license management capability 103-1 through the digital information reproduction unit with license management capability 103-1.

The digital information reproduction unit with license management capability 103-1 may record the digital information and its usage conditions and the digital information key supplied from the digital information vending apparatus 101 onto a storage section integrally arranged on the digital information reproduction unit with license management capability 103-1.

The recording medium with license management capability 102-1 with the digital information 6 recorded by the digital information vending apparatus 101 is loaded, via an interface 113-2 and an interface 114, into the digital information reproduction unit with license management capability 103-2 for example connected to the personal computer 104. The digital information reproduction unit with license management capability 103-2 can read the digital information 6 from the recording medium with license management capability 102-2 and use the digital information 6 on the basis of its usage conditions.

The recording medium with license management capability 102-1 or 102-2 is constituted by semiconductor memory such as flash memory, magnetic disc such as floppy disc, optical disc such as Compact Disc (trademark), or magneto-optical disc such as Mini Disc (trademark).

The personal computer 104 can read the digital information 6 from the recording medium with license management capability 102-2 via the digital information reproduction unit with license management capability 103-2 and use the digital information 6 on the basis of its usage conditions.

It should be noted that the interface 112, the interfaces 113-1 and 113-2, and the interface 114 can use any of wired communication schemes such as USB (Universal Serial Bus), IEEE (Institute of Electrical and Electronics Engineers) 1394 and SCSI (Small Computer System Interface) or infrared communication such as IrDA (Infrared Data Association) or wireless communication such as Bluetooth.

Figure 3:
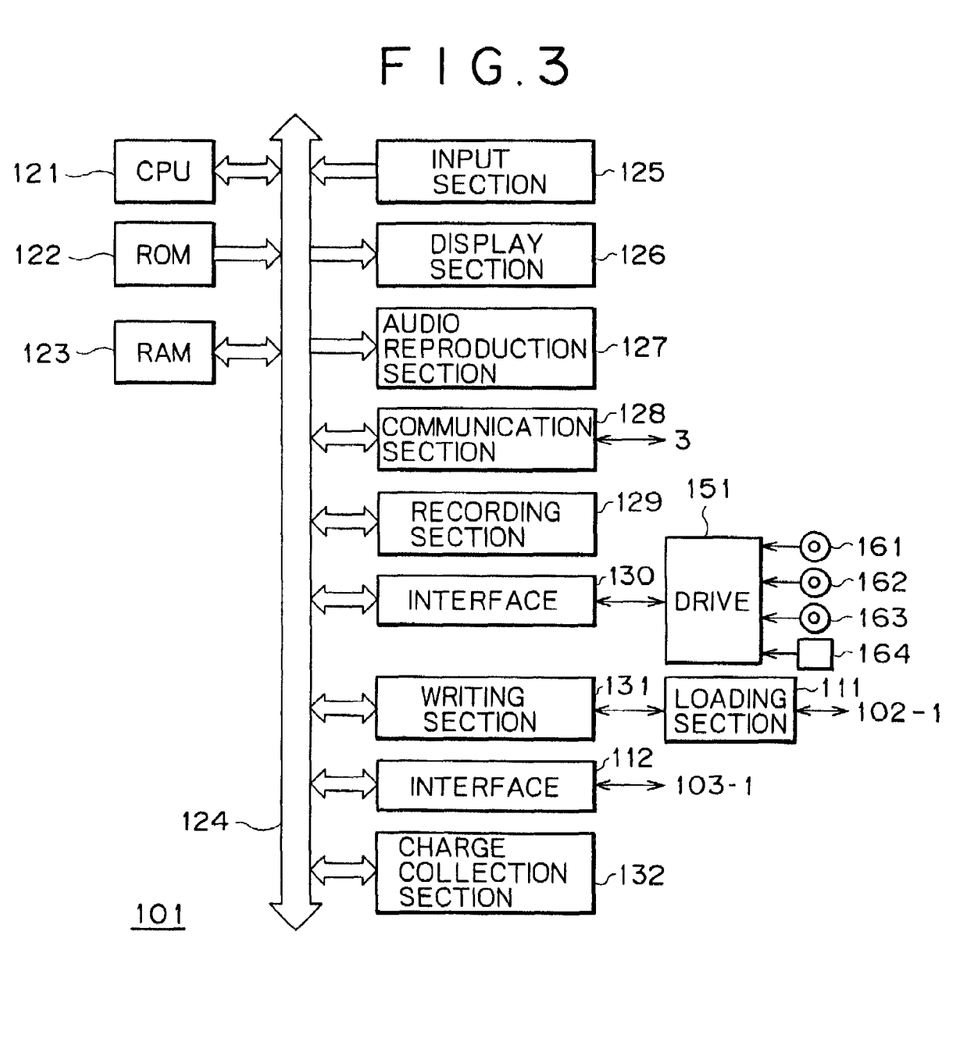
FIG. 3 is a block diagram illustrating an exemplary configuration of the digital information vending apparatus 101.

FIG. 3 illustrates one example of the configuration of the digital information vending apparatus 101. A CPU (Central Processing Unit) 121 executes various application programs and an OS (Operating System). ROM (Read Only Memory) 122 generally stores programs and basically fixed data of computational parameters to be used by the CPU 121. RAM (Random Access Memory) 123 stores programs to be used by the CPU 121 in its execution and parameter that changes from time to time in the execution.

An input section 125, constituted by a touch pad or an input key arranged on a display section 126, is operated by the purchase when inputting various commands into the CPU 121. The display section 126, constituted by a liquid crystal display device or a CRT (Cathode Ray Tube), displays various kinds of information in the form of text or image. An audio reproduction section 127 outputs sound on the basis of the music data for example contained in the digital information 6 supplied from the CPU 121.

A communication section 128 outputs data such as digital information stored in packets supplied from the server unit 2 to the CPU 121, the RAM 123, or the recording section 129.

A recording section 129, constituted by a HDD (Hard Disk Drive) for example, records programs to be executed by CPU 121 and the digital information 6 and reproduces them from the HDD.

A drive 151 reads data or programs from loaded magnetic disc 161, loaded optical disc 162, loaded magneto-optical disc 163, or semiconductor memory 164 and supplies the retrieved data or the programs to the RAM 123 connected via an interface 130 and a bus 124.

Writing section 131 writes digital information 6 from recording section 129 to recording medium with license management capability 102-1 loaded in loading section 111.

Interface 112 connects to one end of a cable compliant with a predetermined communication scheme and sends digital information 6 from recording section 129 to digital information reproduction unit with license management capability 103-1 connected to the other end of the cable.

Charge collection section 132 supplies signals indicative of whether the money for digital information 6 has been thrown in by a purchaser and indicative of the thrown in amount to CPU 121.

These components, the CPU 121 through the charge collection section 132, are interconnected by the bus 124.

Figure 4:
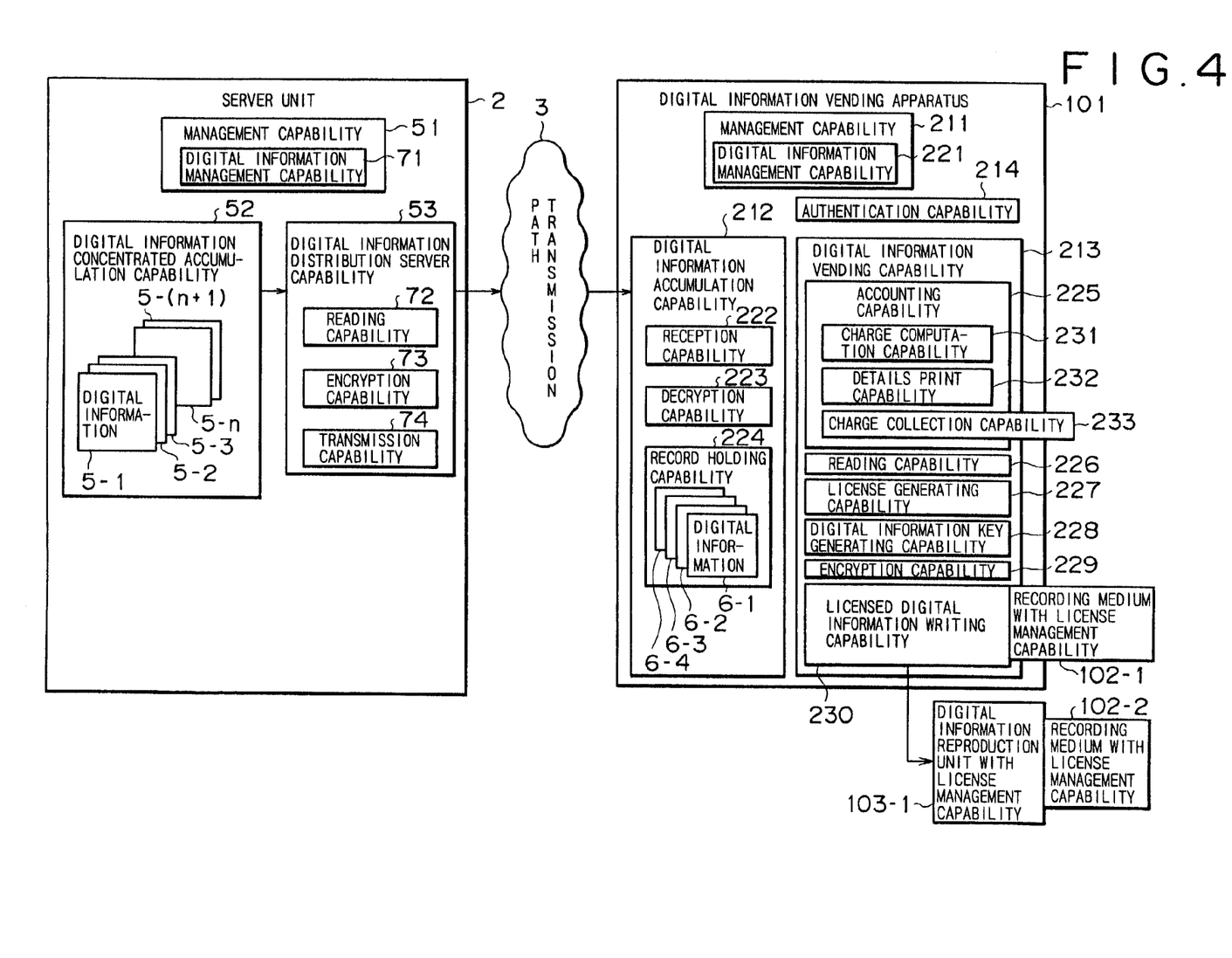
FIG. 4 is a schematic diagram illustrating an exemplary configuration of the digital information vending system practiced as one embodiment of the invention.

FIG. 4 illustrates one example of the configuration of the digital information vending system practiced as another embodiment of the invention. With reference to FIG. 4, components similar to those previously described with FIG. 1 are denoted by the same reference numerals.

A digital information vending apparatus 101 has a management capability 211, a digital information accumulation capability 212, a digital information vending capability 213, and an authentication capability 214, each being implemented by a predetermined software program executed by a CPU 121. The management capability has a digital information management capability 221 to control the digital information accumulation capability 212 and digital information vending capability 213 on the basis of the signals inputted from the input section 125 by a purchaser for example.

The digital information accumulation capability 212 is composed of a reception capability 222, a decryption capability 223, and a recording holding capability 224. The reception capability 222 receives encrypted digital information 5 from the server unit 2 via the transmission path 3 and supplies the received digital information 5 to the decryption capability 223.

The decryption capability 223 stores a digital information key in advance and decrypts the encrypted digital information 5 supplied from the reception capability 222 by the stored key. The record holding capability 224 receives the decrypted digital information 5 from the decryption capability 223 and records the received information as arranged in digital information 6-1 through 6-4 for example.

The digital information vending capability 213 comprises an accounting capability 225, a reading capability 226, a license generating capability 227, a digital information key generating capability 228, an encryption capability 229, and a licensed digital information writing capability 230.

When any of the digital information 6-1 through 6-4 accumulated in the digital information accumulation capability 212 has been purchased, the accounting capability 225 collects an amount of money for the purchased digital information from the purchaser. In addition, the accounting capability 225 comprises a charge computation capability 231, a details print capability 232, and the charge collection capability 233.

The charge computation capability 231 computes the charges of sold one of the digital information 6-1 through 6-4 sold. The details print capability 232 prints, on a receipt, in barcode for example, such information about sold one of the digital information 6-1 through 6-4 as its sale price for example.

The charge collection capability 233 causes the charge collection section 132 to collect, on the basis of the signal supplied from the charge collection section 132, the amount of money paid for sold one of the digital information 6-1 through 6-4 sold.

When the amount of money has been paid for the digital information 6-1 through 6-4 sold, the reading capability 226 reads sold one of the digital information 6-1 through 6-4 from the digital information accumulation capability 212 and supplies the retrieved one of the digital information 6-1 through 6-4 to the encryption capability 229.

The license generating capability 227 generates usage conditions of the sold one of the digital information 6-1 through 6-4 on the basis of the signal for example inputted from the input section 125 by the purchaser and supplies the generated usage conditions to the licensed digital information writing capability 230.

The digital information key generating capability 228 generates a digital information key for the sold one of the digital information 6-1 through 6-4 and supplies the generated digital information key to the encryption capability 229.

The encryption capability 229 encrypts sold one of the digital information 6-1 through 6-4 supplied from the reading capability 226 so as to decrypt the sold one of the digital information by the digital information key supplied by the digital information key generating capability 228. Also, the encryption capability 229 may encrypt the sold one of the digital information 6-1 through 6-2 along with its usage conditions. The encryption capability 229 supplies the encrypted sold one of the digital information 6-1 through 6-4 to the licensed digital information writing capability 230 along with the digital information key.

The licensed digital information writing capability 230 writes the sold one of digital information 6-1 through 6-4 supplied from encryption capability 229 to authenticated recording medium with license management capability 102-1 along with the usage conditions and the digital information key. Also, licensed digital information writing capability 230 writes encrypted sold one of digital information 6-1 through 6-4 to the digital information reproduction unit with license management capability 103-1 in which the recording medium with license management capability 102-1 is loaded.

Figure 5:
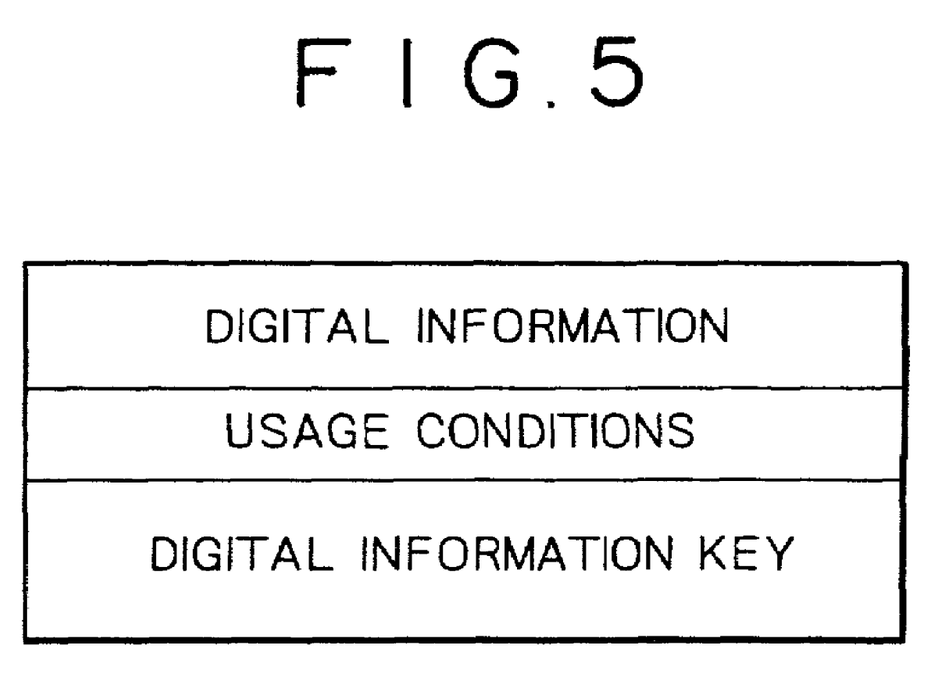
FIG. 5 is a diagram illustrating digital information 6 added with its usage conditions and a digital information key.

As shown in FIG. 5, digital information 6 to be supplied to the recording medium with license management capability 102-1 or the digital information reproduction unit with license management capability 103-1 is correlated with the usage conditions for using the digital information 6 and the digital information key for decrypting the digital information 6. When the digital information 6 is used, the recording medium with license management capability 102-1 or the digital information reproduction unit with license management capability 103-1 decrypts the digital information 6 by the digital information key to use the digital information 6 in accordance with its usage conditions.

For example, if the usage conditions allow the movement of the digital information 6 but prohibit its copying, the recording medium with license management capability 102-1 or the digital information reproduction unit with license management capability 103-1 can move the digital information 6 but cannot copy the same to other devices.

The authentication capability 214 authenticates the loaded recording medium with license management capability 102-1 or the digital information reproduction unit with license management capability 103-1 (connected) in which the recording medium with license management capability 102-1 is loaded by following a procedure to be described later.

It should be noted that the management capability 211, the digital information accumulation capability 212, the digital information vending capability 213, and the authentication capability 214 may be implemented by a dedicated hardware device, respectively.

Figure 6:
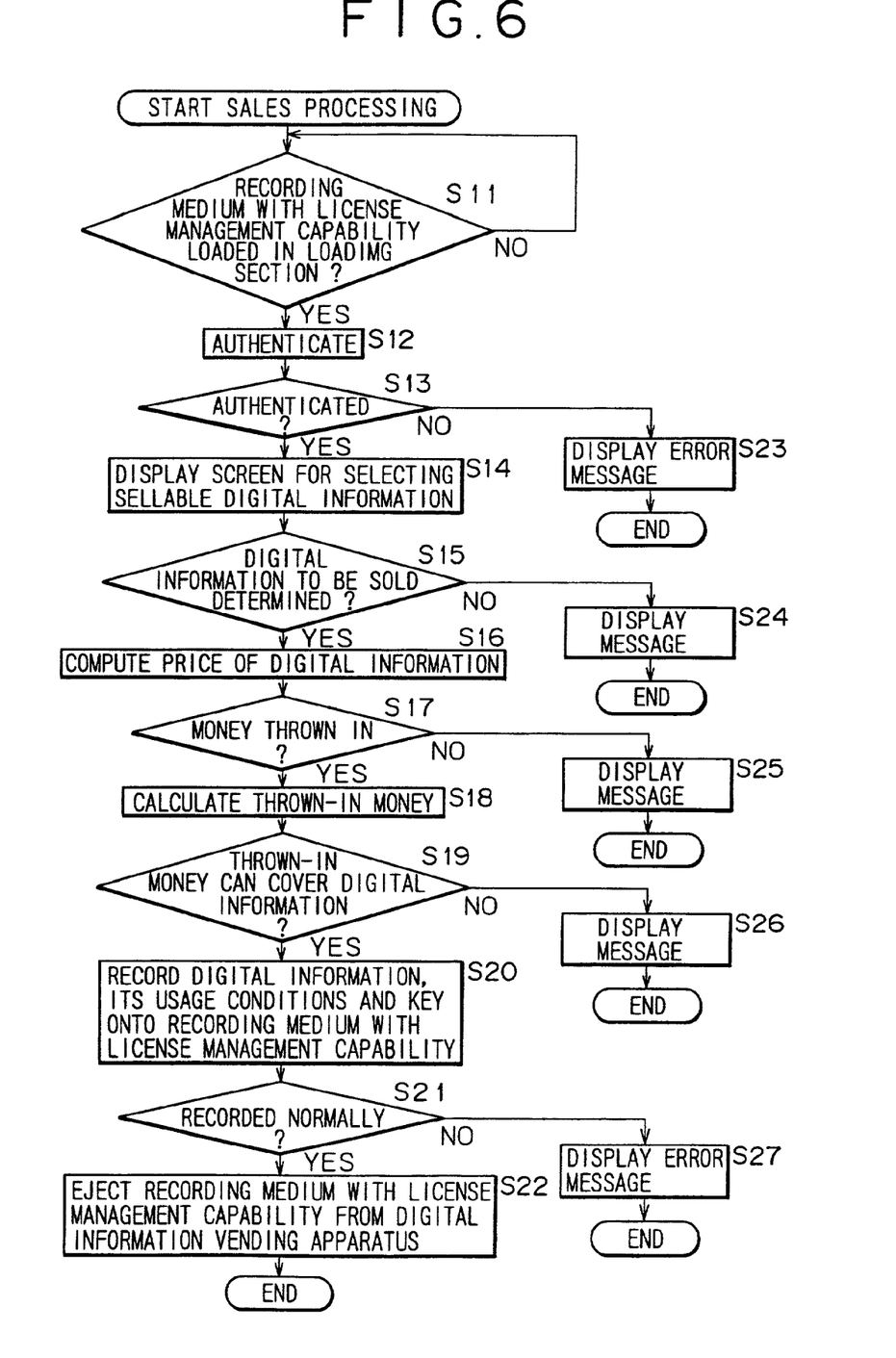
FIG. 6 is a flowchart describing a process of selling digital information 6 of the digital information vending apparatus 101.

The following describes the processing of selling the digital information 6 of the digital information vending apparatus 101 when the digital information is written for sale to the recording medium with license management capability 102-1 owned by the purchaser, with reference to the flowchart shown in FIG. 6. In step S11, the management capability 211 determines, on the basis of the signal supplied from the writing section 131, whether or not the recording medium with license management capability 102-1 is loaded in the loading section 111 of the digital information vending apparatus 101. If the recording medium with license management capability 102-1 is not found loaded in the loading section 111, the determination process in step S11 is repeated until the recording medium with license management capability 102-1 is loaded.

If the recording medium with license management capability 102-1 is found loaded in the loading section 111 in step S11, then the authentication capability 214 authenticates the recording medium with license management capability 102-1 loaded in the loading section 111 in step S12.

Figure 7:
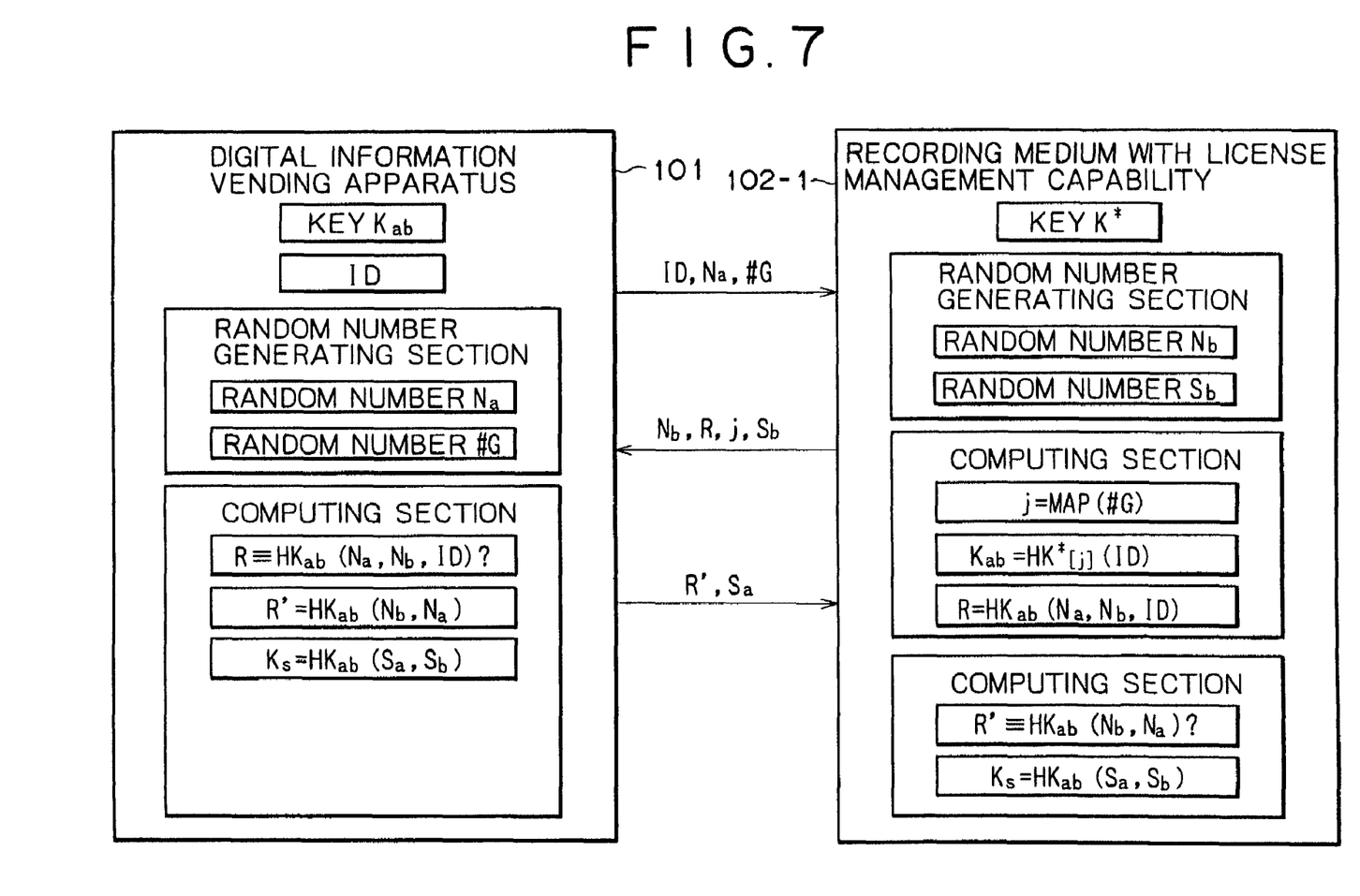
FIG. 7 is a schematic diagram illustrating a process of cross authentication between authentication capability 214 of the digital information vending apparatus 101 and recording medium with license management capability 102-1.

FIG. 7 illustrates the processing of cross-authentication between the authentication capability 214 of the digital information vending apparatus 101 and the recording medium with license management capability 102-1. The cross-authentication between the digital information vending apparatus 101 and the recording medium with license management capability 102-1 is executed in a challenge and response manner for example.

The digital information vending apparatus 101 previously records a key Kab and an ID of its own. The recording medium with license management capability 102-1 previously records a key K* (consists of two or more keys).

The authentication capability 214 of the digital information vending apparatus 101 generates random numbers Na and #G by its internal random number generator and sends these random numbers Na and #G to the recording medium with license management capability 102-1 along with the ID.

The recording medium with license management capability 102-1 generates random numbers Nb and Sb by its internal random number generator. The recording medium with license management capability 102-1 receives the ID of the digital information vending apparatus 101 and the random numbers Na and #G supplied from digital information vending apparatus 101. A computation section of the recording medium with license management capability 102-1 applies a predetermined function to the random number #G to generate a variable j.

On the basis of variable j, the computation section of the recording medium with license management capability 102-1 selects predetermined key $K^*_{[j]}$ from among the key K* consisting of two or more keys and, by use of the selected key $K^*_{[j]}$, applies a hash function to the ID of the digital information vending apparatus 101 to obtain the key Kab.

By use of the key Kab, the computation section of the recording medium with license management capability 102-1 applies a hash function to the random number Na received from the digital information vending apparatus 101, the generated random number Nb, and the ID of the digital information vending apparatus 101 to compute a variable R.

The recording medium with license management capability 102-1 sends the random number Nb, the variable R, the variable j, and the random number Sb to the digital information vending apparatus 101.

The digital information vending apparatus 101 receives the random number Nb, the variable R, the variable j, and the random number Sb supplied by the recording medium with license management capability 102-1.

The authentication capability 214 of the digital information vending apparatus 101 determines whether or not a value obtained by applying a hash function to the random number Na, the random number Nb received from the recording medium with license management capability 102-1, and the ID of the digital information vending apparatus 101 by use of the key Kab is equal to the variable R received from the recording medium with license management capability 102-1. If the value is found equal to the variable R, then the authentication capability 214 authenticates the recording medium with license management capability 102-1 to be valid.

If the value obtained by applying a hash function to the random number Na, the random number Nb, and the ID by use of the key Kab is found unequal to the variable R, then the authentication capability 214 of the digital information vending apparatus 101 determines that the recording medium with license management capability 102-1 is invalid, upon which the authentication processing comes to an end without the authenticating recording medium with license management capability 102-1.

If the recording medium with license management capability 102-1 is found valid, then the authentication capability 214 of the digital information vending apparatus 101 applies a hash function to the random number Nb and the random number Na by use of the key Kab to compute a variable R'. The authentication capability 214 of the digital information vending apparatus 101 applies a hash function to the random number Sa and the random number Sb by use of the key Kab to compute a temporary key Ks.

The authentication capability 214 of the digital information vending apparatus 101 sends the variable R' and the random number Sa to the recording medium with license management capability 102-1.

The recording medium with license management capability 102-1 receives the variable R' and the random number Sa supplied from the digital information vending apparatus 101.

The recording medium with license management capability 102-1 determines whether or not a value obtained by applying a hash function to the random number Nb and the random number Na by use of the key Kab is equal to the variable R' received from the recording medium with license management capability 102-1. If the value obtained by applying a hash function to the random number Nb and the random number Na by use of the key Kab is found equal to the variable R', then the recording medium with license management capability 102-1 determines that the digital information vending apparatus 101 is valid.

If the value obtained by applying a hash function to the random number Nb and the random number Na by use of the key Kab is found unequal to the variable R', then the recording medium with license management capability 102-1 determines that the digital information vending apparatus 101 is invalid, upon which the authentication processing comes to an end without the authenticating digital information vending apparatus 101.

If the digital information vending apparatus 101 is authenticated valid, the recording medium with license management capability 102-1 applies a hash function to the random number Sa and the random number Sb by use of the key Kab to compute a temporary key Ks.

Thus, the digital information vending apparatus 101 and the recording medium with license management capability 102-1 cross-authenticate each other and, upon successful cross-authentication, share the common temporary key Ks.

It should be noted that, instead of using hash functions, DES may be used for cross-authentication.

In step S13, the management capability 211 determines whether or not the recording medium with license management capability 102-1 has been successfully authenticated in step S12 and, if the recording medium with license management capability 102-1 is found successfully authenticated, then, in step S14, displays a selection screen for sellable digital information 6 on the display section 126 on the basis of the data supplied from the digital information accumulation capability 212.

In step S15, the management capability 211 determines, on the basis of a signal inputted from the input section 125 by the purchaser, whether or not digital information to be sold has been determined. If a digital signal to be sold is found determined, then the management capability 211 causes the charge computation capability 231 of the digital information vending capability 213 to compute the price of the digital information 6 for sale in step S16.

In step S17, the management capability 211 determines, on the basis of a signal supplied from the charge collection section 132 of the digital information vending capability 213, whether or not the corresponding amount of money has been thrown into the charge collection section 13. If the amount of money is found thrown into the charge collection section 132, then the management capability 211 causes the charge collection capability 233 to count the amount of money thrown into the charge collection section 132 in step S18.

In step S19, the management capability 211 determines, on the basis of the price of the digital information 6 computed in step S16 and the amount of money thrown into the charge collection section 132 supplied from the charge collection capability 233, whether or not digital information 6 can be sold at the amount of money thrown in. If it is found that the digital information 6 can be sold at the amount of money thrown in, then the management capability 211 causes the reading capability 226 to read the specified digital information 6 from the record holding capability 224 in step S20. The license generating capability 227 generates the usage conditions for the retrieved digital information 6. The digital information key generating capability 228 generates a digital information key for decrypting the digital information 6. The encryption capability 229 encrypts this digital information 6 by DES for example.

The licensed digital information writing capability 230 records this digital information 6 to the recording medium with license management capability 102-1 along with its usage conditions and the digital information key.

In step S21, the management capability 211 determines, on the basis of a signal supplied from the writing section 131 or the licensed digital information writing capability 230, whether or not digital information 6 and its usage conditions and the digital information key have been normally recorded on the recording medium with license management capability 102-1. If the digital information 6 and its usage conditions and the digital information key are found normally recorded on the recording medium with license management capability 102-1, then the management capability 211 ejects the recording medium with license management capability 102-1 from the loading section 111 of the digital information vending apparatus 101 in step S22, upon which the digital information sale processing comes to an end.

In step S13, if the recording medium with license management capability 102-1 is found not successfully authenticated, it indicates that the recording medium with license management capability 102-1 is not compliant one. Then, in step S23, the management capability 211 displays an error message on the display section 126 that the recording medium with license management capability 102-1 is not a compliant recording medium, upon which the digital information selling processing comes to an end.

In step S15, if the digital information to be sold is not selected and it is determined that a request for discontinuing the processing has been made, then the management capability 211 displays a message on the display section 126 that the processing has been discontinued in step S24, upon which the digital information selling processing comes to an end.

In step S17, if the amount of money has not been thrown into the charge collection section 132 and it is determined that a request for discontinuing the processing has been made, then the management capability 211 displays a message on display section 126 that the processing has been discontinued, upon which the digital information selling processing comes to an end.

In step S19, if the digital information 6 is found not sellable for the inputted amount of money, then the management capability 211 displays, in step S26, a message on the display section 126 that the processing has been discontinued because of the inputted money does not amount to the price of the digital information 6. The management capability 211 causes charge collection section 132 to eject the inputted money, upon which the digital information selling processing comes to an end.

In step S21, if the digital information 6 is found not normally recorded on recording medium with license management capability 102-1 along with the usage conditions and the digital information key, then the management capability 211 displays, in step S27, a message on the display section 126 that the writing operation has failed, upon which the digital information selling processing comes to an end.

Thus, the digital information vending apparatus 101 can record the digital information 6 on the recording medium with license management capability 102-1 along with the usage conditions and the digital information key.

It should be noted that the digital information vending apparatus 101 writes, in generally the same processing as described above, the digital information 6 and its usage conditions and the digital information key onto the digital information reproduction unit with license management capability 103-1 with the recording medium with license management capability 102-2 loaded.

Figure 8:
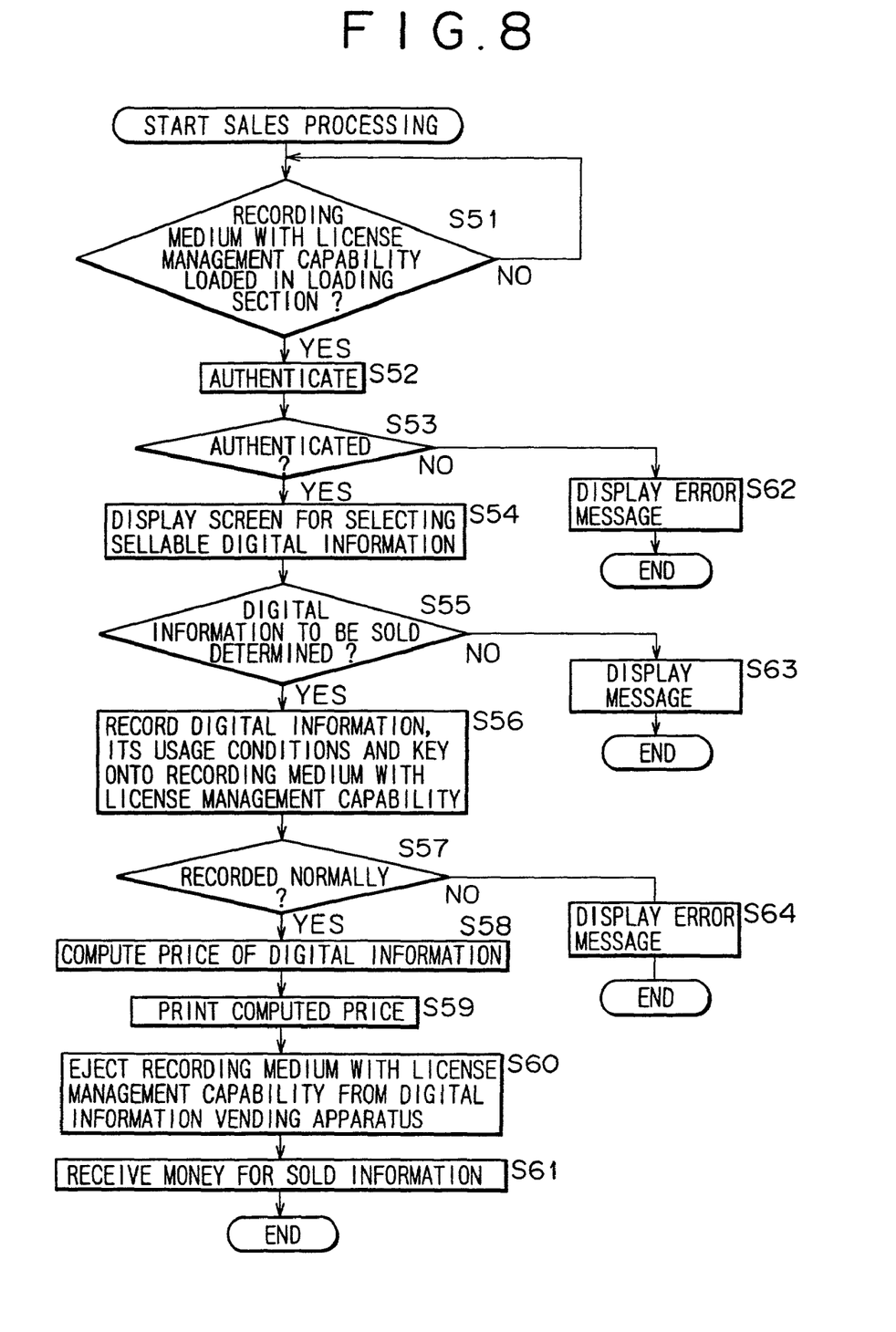
FIG. 8 is a flowchart describing another example of selling digital information 6 the digital information vending apparatus 101.

The following describes another method of processing for selling digital information 6 of the digital information vending apparatus 101 by writing the digital information 6 onto the recording medium with license management capability 102-1 owned by a purchaser, with reference to the flowchart shown in FIG. 8. The processes of steps S51 through S55 are the same as those steps S11 through S15 of FIG. 6, so that their descriptions will be omitted.

If, in step S55, the digital information 6 to be sold has been determined, then the management capability 211 causes, in step S56, the reading capability 226 to read the digital information 6 to be sold from the record holding capability 224. The license generating capability 227 generates the usage conditions for the digital information 6 to be sold. The digital information key generating capability 228 generates a digital information key for decrypting this digital information 6. The encryption capability 229 encrypts this digital information 6 by the DES for example.

The licensed digital information writing capability 230 records this digital information 6 onto the recording medium with license management capability 102-1 along with its usage conditions and the digital information key.

In step S57, the management capability 211 determines, on the basis of a signal supplied from the writing section 131 or the licensed digital information capability 230, whether or not the above-mentioned digital information 6 has been normally written to the recording medium with license management capability 102-1 along with its usage conditions and the digital information key. If this digital information 6 is found normally written to the recording medium with license management capability 102-1 along with its usage conditions and the digital information key, then the management capability 211 causes, in step S58, the charge computation capability 231 of the digital information vending capability 213 to compute the price of the digital information 6 to be sold.

In step S59, the management capability 211 causes the details print capability 232 to print on a receipt, in numeral or barcode for example, the price computed in step S58 for the sold digital information 6.

In step S60, the management capability 211 ejects the recording medium with license management capability 102-1 from the loading section 111 of the digital information vending apparatus 101.

In step S61, management capability 211 causes the charge collection capability 233 to receive the amount of money paid for the sold digital information 6, upon which the above-mentioned example of the digital information selling processing comes to an end.

If, in step S53, the recording medium with license management capability 102-1 is found not authenticated, it indicates that the recording medium with license management capability 102-1 is invalid, so that the management capability 211 displays, in step S62, a message on the display section 126 that the authentication has failed, upon which the above-mentioned processing comes to an end.

If, in step S55, if the digital information 6 to be sold is not determined and therefore it is determined that the discontinuation of the processing has been requested, then the management capability 211 displays, in step S63, a message on the display section 126 that the processing has been discontinued, upon which the above-mentioned processing comes to an end.

If, in step S57, the digital information 6 is found not normally recorded onto the recording medium with license management capability 102-1 along with its usage conditions and the digital information key, then the management capability 211 displays, in step S64, a message on the display section 126 that the writing operation failed, upon which the above-mentioned processing comes to an end.

Thus, the above-mentioned latter example of selling the digital information 6 of the digital information vending apparatus 101 can cause the same to record the sold digital information 6 to the recording medium with license management capability 102-1 along with its usage conditions and the digital information key.

In the process of step S61, the charge collection capability 233 receives the amount of money for sold digital information 6. Alternatively, the purchaser may be made pay the amount of money at a cashier of the store at which the digital information vending apparatus 101 is installed, on the basis of the price of the sold digital information 6 printed through the processing in step S59.

The above-mentioned sequences of processes can be executed by hardware or software. The execution by the software is supported by a computer in which the programs constituting the software are installed in a dedicated hardware device beforehand or by a general-purpose personal computer capable of executing various capabilities in which these programs are installed from the program storage medium.

The program storage medium for storing computer-readable and executable programs may be a package medium constituted by the magnetic disc 161 (including floppy disk), the optical disc 162 (including CD-ROM (Compact Disc-Read Only Memory) and DVD (Digital Versatile Disc)), the magneto-optical disc 163 (including MD (Mini Disk)), or the semiconductor memory 164 or the ROM 122 on which the programs are stored temporarily or permanently or the hard disk constituting the recording section 129 as shown in FIG. 3 Programs are stored in the program storage medium from wired or wireless communications media such as a local area network, the Internet, and digital satellite broadcasting through the communications section 128 as required.

It should be noted that the steps describing the programs to be stored in the program storage medium are not only executed in a time-dependent manner in the order described, but also in parallel or in a discrete manner.

It should also be noted that the system as used herein denotes an entire apparatus constituted by a plurality of component units.

While the preferred embodiments of the present invention have been described using specific terms, such description is for illustrative purposes only, and it is to be understood that changes and variations may be made without departing from the spirit or scope of the appended claims.

What is claimed is:

1. An apparatus comprising:
   accumulation means for accumulating information for sale;
   usage condition generating means for generating usage conditions in response to a purchase selection of the information for sale;
   encryption means for encrypting said purchase selection;
   encryption key generating means for generating a cryptographic key which decrypts said purchase selection;
   writing means for writing said purchase selection along with said usage conditions for said license management capability and said cryptographic key to a portable recording medium upon authentication; and
   determining means for determining, based on a cross-authentication signal supplied from the writing means, whether or not said portable recording medium is capable of supporting a license management capability for reproducing said purchase selection in accordance with the usage conditions prior to writing a purchase selection thereto, said portable recording medium directly or indirectly loaded on said apparatus, wherein
   the cross-authentication signal is a challenge response to a previously recorded key ID on the portable recorded medium, and said portable recording medium is a memory device configured to be loaded to a player device for reproduction of the information for sale.

2. The apparatus according to claim 1, further comprising:
   communication means for communicating with a reproduction unit for reproducing said purchase selection recorded on said portable recording medium,
   wherein said determining means further authenticates said reproduction unit when said communication means makes communication with said reproduction unit, and
   said writing means writes said purchase selection to said portable recording medium through said reproduction unit along with said usage conditions and said cryptographic key.

3. The apparatus according to claim 2, wherein said reproduction unit is a portable device and said portable medium is detachably loaded on said portable device.

4. The apparatus according to claim 2, wherein said communication means communicates with said reproduction unit which reproduces said purchase selection recorded on said portable recording medium integrally disposed on said reproduction unit, and
   said writing means writes said purchase selection recorded on said portable recording medium integrally disposed on said reproduction unit along with said usage conditions and said cryptographic key.

5. The apparatus according to claim 4, wherein said reproduction unit is a portable device and integrally arranged on said portable device.

6. The apparatus according to claim 1, further comprising:
   a receiving means for receiving said information for sale supplied through a predetermined transmission path, wherein said accumulation means accumulates said information received by said receiving means.

7. The apparatus according to claim 6, wherein said transmission path is the Internet, said information is supplied via the Internet to a server unit, and said information is received from said server unit to be stored in said accumulation means.

8. The apparatus according to claim 1, wherein said usage condition generating means generates said usage conditions which are employed by said reproduction unit which reproduces said purchase selection recorded on said portable recording medium, and said encryption means encrypts said information for sale by use of an algorithm which allows said reproduction unit to decrypt said information for sale.

9. The apparatus according to claim 1, wherein said information for sale includes at least one of program, voice, music, still picture, moving picture, and text data.

10. A method comprising:
accumulating information for sale;
generating usage conditions for said information for sale in response to a purchase selection of information for sale;
encrypting said purchase selection;
generating a cryptographic key which decrypts said information for sale which is encrypted;
writing said purchase selection to a portable recording medium upon authentication along with said usage conditions for said license management capability and said cryptographic key, and
determining, based on a cross-authentication signal supplied from the writing, whether or not said portable recording medium is capable of supporting a license management capability for reproducing said purchase selection in accordance with the usage conditions prior to writing a purchase selection thereto, said portable recording medium directly or indirectly loaded on an apparatus, wherein
the cross-authentication signal is a challenge response to a previously recorded key ID on the portable recorded medium, and said portable recording medium is a memory device configured to be loaded to a player device for reproduction of the information for sale.

11. The method according to claim 10, further comprising:
communicating with a reproduction unit for reproducing said purchase selection recorded on said portable recording medium,
wherein in said authentication, said reproduction unit is further authenticated when in said communication said reproduction unit is communicated, and
in said writing, said encrypted information for sale along with said usage conditions and said cryptographic key are written to said portable recording medium through said reproduction unit.

12. The method according to claim 11, wherein said reproduction unit is a portable device and said portable medium is detachably loaded on said portable device.

13. The method according to claim 11, wherein in said communication, said reproduction unit which reproduces said purchase selection recorded on said portable recording medium integrally disposed on said reproduction unit is communicated, and
in said writing, said purchase selection along with said usage conditions and said cryptographic key are written to said portable recording medium integrally disposed on said reproduction unit.

14. The method according to claim 13, wherein said reproduction unit is a portable device and said storage medium is fixedly and integrally arranged on said portable device.

15. The method according to claim 10, further comprising:
receiving said information for sale supplied through a predetermined transmission path,
wherein in said accumulation, said information received by said receiving means is accumulated.

16. The method according to claim 15,
wherein said transmission path is the Internet, said information is supplied via the Internet to a server unit, and said information is received from said server unit to be stored in said accumulation.

17. The method according to claim 10, wherein in said usage condition generating, said usage conditions which are employed by said reproduction unit which reproduces said purchase selection recorded on said portable recording medium are generated; and
in said encryption, said purchase selection is accessed by use of an algorithm which allows said reproduction unit to decrypt said purchase selection.

18. The method according to claim 10, wherein said information for sale includes at least one of program, voice, music, still picture, moving picture, and text data.

19. A program storage medium for storing a computer-readable program, said program causing a computer to implement a method comprising:
accumulating information for sale;
generating usage conditions for said information for sale in response to a purchase selection of the information for sale;
encrypting said purchase selection;
generating a cryptographic key which decrypts said purchase selection which is encrypted;
writing said purchase selection information to a portable recording medium upon authentication along with said usage conditions for said license management capability and said cryptographic key; and
determining, based on a cross-authentication signal supplied from the writing, whether or not said portable recording medium is capable of supporting a license management capability for reproducing said purchase selection in accordance with the usage conditions prior to writing a purchase selection thereto, said portable recording medium directly or indirectly loaded on an apparatus, wherein
the cross-authentication signal is a challenge response to a previously recorded key ID on the portable recorded medium, and said portable recording medium is a memory device configured to be loaded to a player device for reproduction of the information for sale.

20. An apparatus comprising:
an accumulation unit configured to accumulate information for sale;
a usage condition generating unit configured to provide usage conditions for said information for sale in response to a purchase selection of information for sale;
an encryption unit configured to encrypt said purchase selection;
an encryption key generating unit configured to generate a cryptographic key which decrypts said purchase selection;
a writing unit configured to write said purchase selection to a portable recording medium along with said usage conditions for said license management capability and said cryptographic key upon authentication; and
a determining unit configured to determine, based on a cross-authentication signal supplied from the writing unit, whether or not said portable recording medium is capable of supporting a license management capability for reproducing said purchase selection in accordance with the usage conditions prior to writing a purchase selection thereto, said portable recording medium directly or indirectly loaded on said apparatus, wherein the cross-authentication signal is a challenge response to a previously recorded key ID on the portable recorded medium, and said portable recording medium is a memory device configured to be loaded to a player device for reproduction of the information for sale.

* * * * *

UNITED STATES PATENT AND TRADEMARK OFFICE
CERTIFICATE OF CORRECTION

PATENT NO. : 7,353,540 B2
APPLICATION NO. : 09/820852
DATED : April 1, 2008
INVENTOR(S) : Haruhiko Kishi et al.

It is certified that error appears in the above-identified patent and that said Letters Patent is hereby corrected as shown below:

Delete Column 14, Line 12 through Column 15, Line 16.

Column 15, Line 17, change "10" to --1--.
    Line 20, after "to a purchase selection of" insert --said--.
    Lines 23-24, change "information for sale" to --purchase selection--.
    Line 27, change "said license" to --a license--.
    Line 31, change "supporting a" to --supporting said--.
    Line 33, change "accordance with the" to --accordance with said--.
    Line 37, change "the portable" to --said portable--.
    Line 37, change "recorded" to --recording--.
    Line 40, change "the information" to --said information--.
    Line 41, change "11" to --2--.
    Line 41, change "10" to --1--.
    Line 46, change "authentication" to --determining--.
    Line 47, change "communication" to --communicating--.
    Line 52, change "12" to --3--.
    Line 52, change "11" to --2--.
    Line 54, before "medium" insert --recording--.
    Line 55, change "13" to --4--.
    Line 55, change "11" to --2--.
    Line 56, change "communication" to --communicating--.
    Line 64, change "14" to --5--.
    Line 64, change "13" to --4--.
    Line 65, change "storage" to --portable recording--.

Column 16, Line 1, change "15" to --6--.
    Line 1, change "10" to --1--.
    Line 5, change "accumulation" to --accumulating--.
    Line 5, after "information" insert --for sale--.
    Line 6, after "said receiving" delete "means".

Column 16, Line 7, change "16" to --7--.
    Line 7, change "15" to --6--.
    Line 8, before "transmission" insert --predetermined--.
    Line 9, before "is supplied" insert --for sale--.
    Line 10, after "said information" insert --for sale--.
    Line 11, change "accumulation" to --accumulating--.
    Line 12, change "17" to --8--.
    Line 12, change "10" to --1--.

UNITED STATES PATENT AND TRADEMARK OFFICE
CERTIFICATE OF CORRECTION

PATENT NO. : 7,353,540 B2
APPLICATION NO. : 09/820852
DATED : April 1, 2008
INVENTOR(S) : Haruhiko Kishi et al.

It is certified that error appears in the above-identified patent and that said Letters Patent is hereby corrected as shown below:

Line 13, before "usage condition generating" insert --generating--.
Line 13, change "condition generating" to --conditions--.
Line 14, change "by said reproduction unit" to --by a reproduction unit--.
Line 16, change "encryption" to --encrypting--.
Line 19, change "18" to --9--.
Line 19, change "10" to --1--.
Line 22, change "19" to --10--.
Line 27, change "selection of the" to --selection of said--.
Line 32, change "information" to --selection--.
Line 33, change "conditions for said" to --conditions for a--.
Line 37, change "supporting a license" to --supporting said license--.
Line 39, change "the usage conditions" to --said usage conditions--.
Line 44, change "on the portable recorded" to --on said portable recording--.
Line 47, change "the information" to --said information--.
Line 48, change "20" to --11--.
Line 52, after "purchase selection of" insert --said--.
Line 60, change "said license management" to --a license management--.
Line 65, change "supporting a license" to --supporting said license--.
Line 67, change "with the usage" to --with said usage--.

Column 17, Line 4, change "on the portable recorded" to --on said portable recording--.

Signed and Sealed this

Thirty-first Day of March, 2009

JOHN DOLL
*Acting Director of the United States Patent and Trademark Office*